United States Patent [19]

L'Henaff et al.

[11] Patent Number: 4,700,743
[45] Date of Patent: Oct. 20, 1987

[54] MINIATURE FLUIDIC CONNECTOR

[75] Inventors: Patrick L'Henaff, Colomiers; Herve Bricaud, Toulouse, both of France

[73] Assignee: Amphenol Corporation, Wallingford, Conn.

[21] Appl. No.: 838,508

[22] Filed: Mar. 11, 1986

[30] Foreign Application Priority Data

Mar. 18, 1985 [FR] France ................................ 85 03969

[51] Int. Cl.$^4$ ............................................. F16L 37/28
[52] U.S. Cl. ................................ 137/560; 137/614.04
[58] Field of Search ..................... 137/560, 614, 614.04

[56] References Cited

U.S. PATENT DOCUMENTS

| Re. 23,365 | 5/1951 | Stramberg ...................... 137/614.04 |
| 2,599,935 | 6/1952 | Pasher . | |
| 2,823,048 | 2/1958 | Hausen ........................ 137/614.04 X |
| 2,968,497 | 1/1961 | Treleman ......................... 251/149.4 |
| 3,800,826 | 4/1974 | McCann .............................. 137/560 |
| 4,106,523 | 8/1978 | Thomton et al. . | |
| 4,445,536 | 5/1984 | Willis ................................... 137/560 |
| 4,486,060 | 12/1984 | Currall ................................ 137/560 |

FOREIGN PATENT DOCUMENTS

| 479943 | 4/1929 | Fed. Rep. of Germany ......................... 137/614.04 |
| 3232367 | 3/1984 | Fed. Rep. of Germany . |
| 76801 | 10/1961 | France ............................. 137/614.04 |
| 2284254 | 4/1976 | France . |

*Primary Examiner*—A. Michael Chambers
*Assistant Examiner*—John C. Fox
*Attorney, Agent, or Firm*—Bacon & Thomas

[57] ABSTRACT

Miniature fluidic connector that fits into an electrical connector for printed circuit boards with a built-in heat exchanger. Male and female fluidic contacts are mountable in openings in the plug or receptacle of the electrical connector and have respective tips to couple with each other. Upon coupling, the ends of the openings of the plug and the receptacle of the electrical connector are substantially in pressure contact against each other. Preferably, the male and female fluidic contacts have inner chambers adapted to receive self-plugging devices.

6 Claims, 10 Drawing Figures

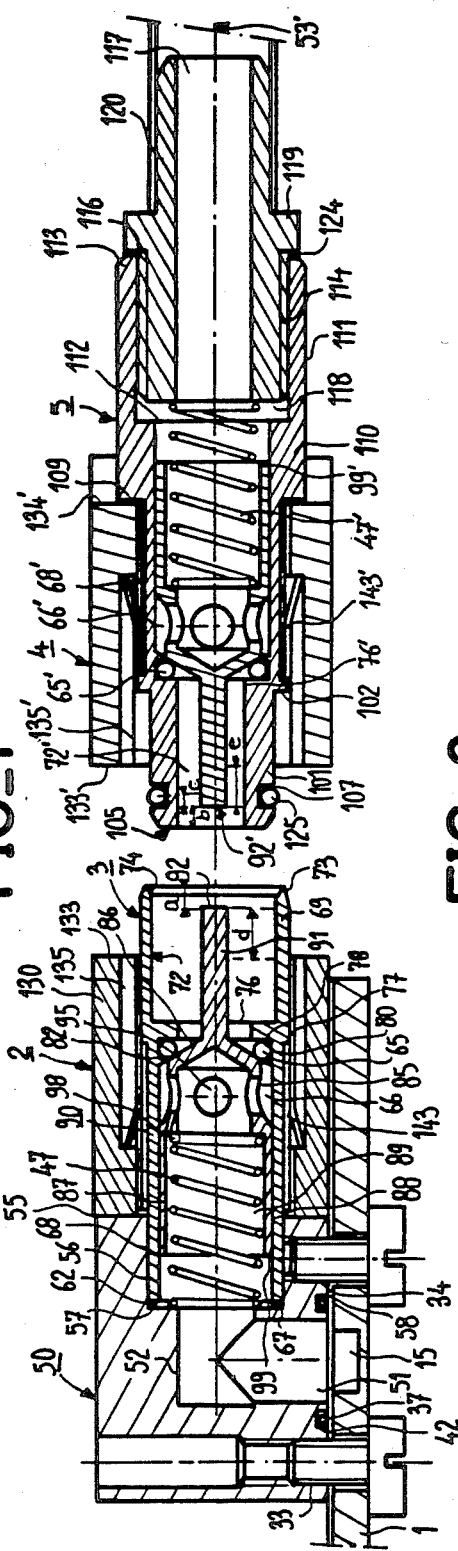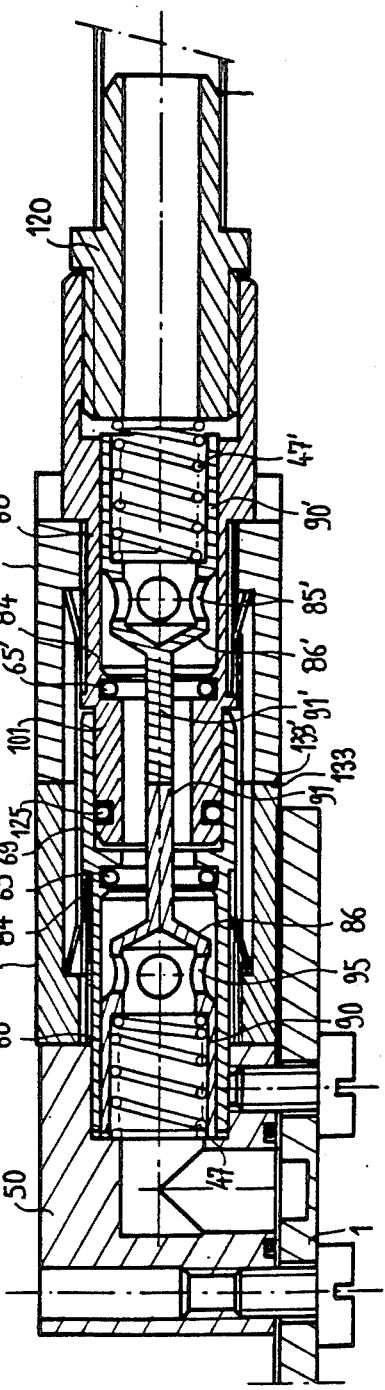

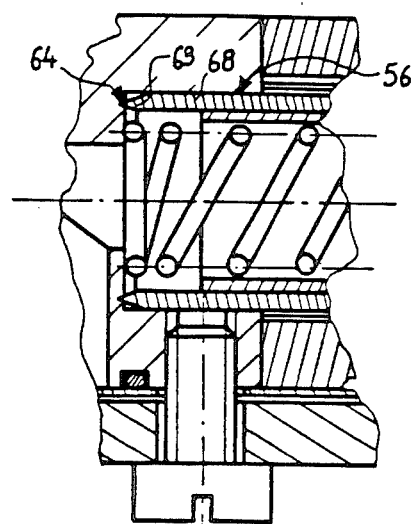
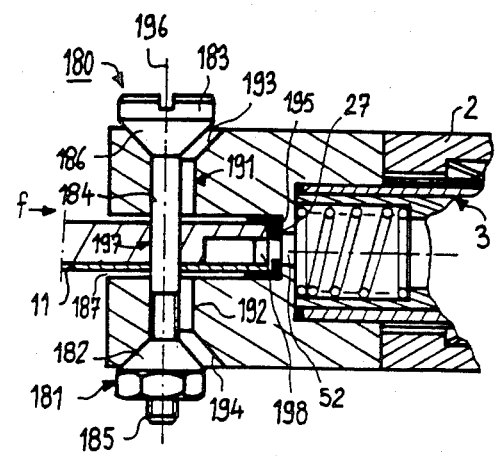
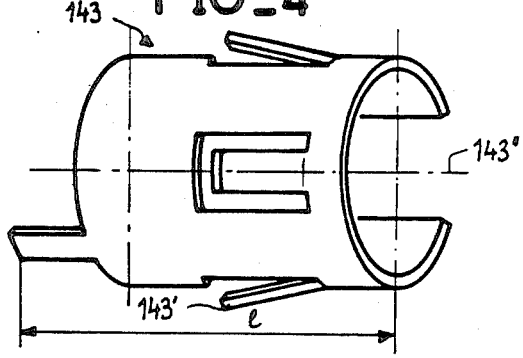
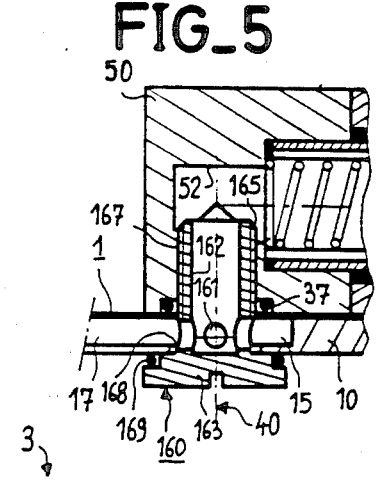
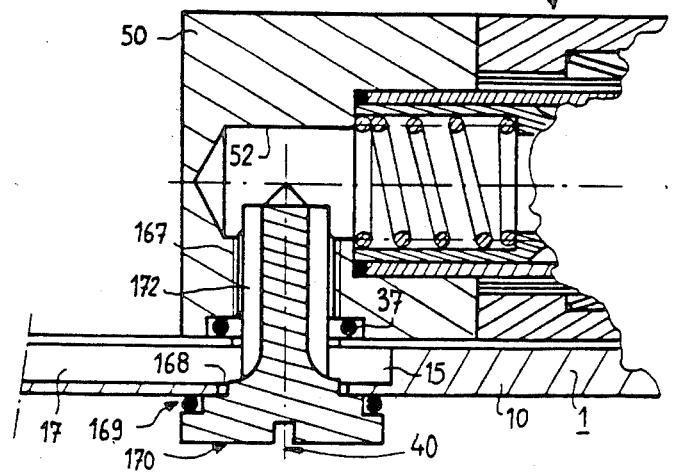

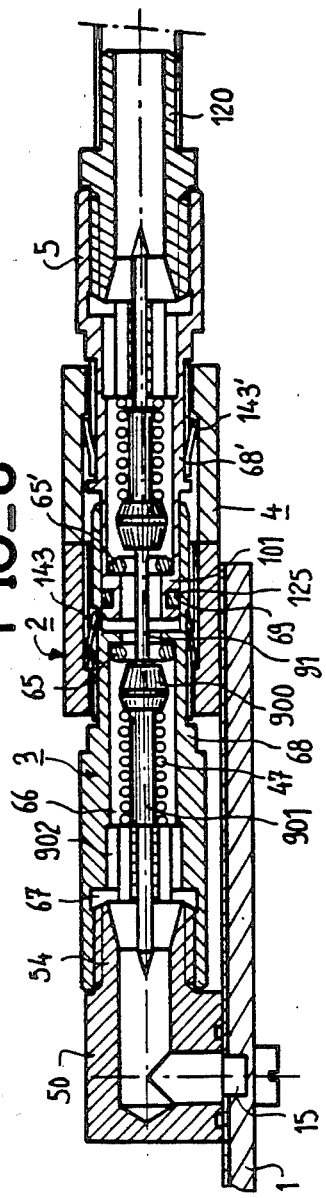
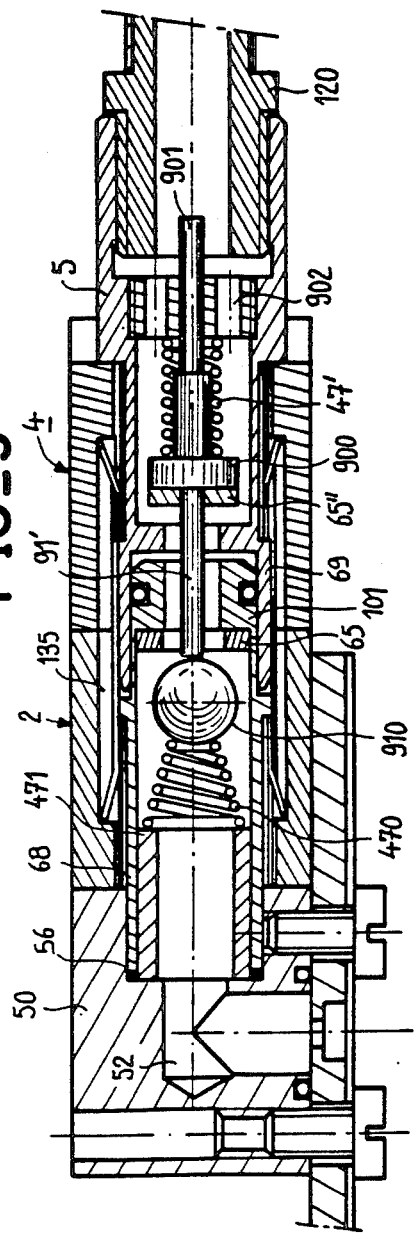

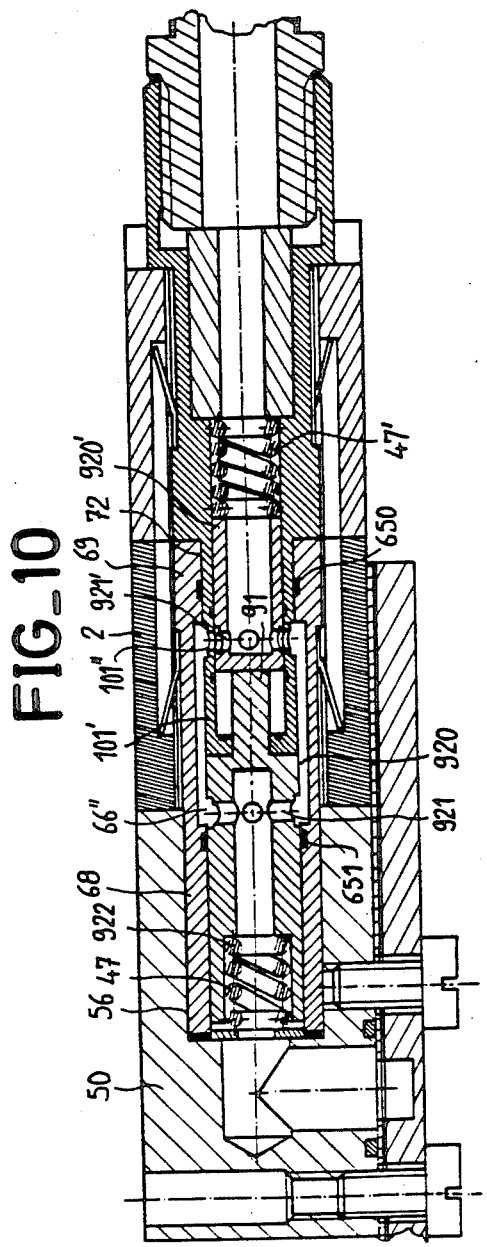

MINIATURE FLUIDIC CONNECTOR

BACKGROUND OF THE INVENTION

1. Field of the Invention

The present invention relates to a miniature fluidic connector, and more particularly a miniature fluidic connector that can be accommodated within an electrical connector of the type consisting of a plug and a receptacle, each provided with openings.

2. Description of the Prior Art

The above type of connector is used in particular with printed cards with a built-in heat exchanger of the type comprising a heat drain equipped with a channel system to insure the fluidic connection of the channel network for heat-carrying fluid of the drain of the printed card with the fluidic circuit integrated in the frame of the electronic equipment. A card of this type is described, in particular, in co-filed patent application entitled "Printed Circuit Card With Heat Exchanger and Method for Making Such a Card", the disclosure of which is expressly incorporated herein by reference.

At the present time there are various types of miniature fluidic connectors on the market. But these connectors cannot be mounted in an input/output electrical connector of standard type such as the connectors complying with French standards HE 8, HE 9, and HE 11.

It would be desirable to provide such minature fluidic connectors which can be mounted in such standarized connectors.

SUMMARY OF THE INVENTION

In accordance with this invention, there is provided a miniature fluidic connector mountable in an electrical connector of the type comprising a plug and a receptacle, each provided with openings, characterized in that it comprises a male fluidic contact and a female fluidic contact, the male fluidic contact being constituted by a contact body permitting the passage of heat-carrying fluid, which is designed to be embedded in an opening of the plug or of the receptacle of the electrical connector, the contact body being prolonged on one side by a male tip and the female fluidic contact being constituted by a contact body permitting the passage of the fluid, designed to be embedded in an opening in the other element of the electrical connector, the contact body being prolonged on one side by a female tip shaped to receive the male tip, the male tip and/or female tip projecting in part relative to the end of its respective opening so that, when coupled, the ends of the openings of the plug and the receptacle of the electrical connector will be substantially pressed against one another.

Thus, the fluidic contacts according to the present invention are adapted to the openings or cavities of the existing input/output connectors with no modification. Moreover, the fluidic contacts according to the invention resemble the conventional contacts such as power contacts, coaxial contacts or optical contacts commonly mounted in the said openings, as far as dimensions and outer appearance are concerned.

According to another aspect of the present invention, the miniature fluidic connector is a self-plugging connector. Consequently, the contact body of the male fluidic contact and/or female fluidic contact comprises an inner chamber designed to receive a self-plugging device.

Various types of self-plugging devices can be mounted in the inner chamber of the male contact or the female contact. According to a preferred embodiment, the self-plugging device is constituted by a valve, an elastic device urging the valve into closed position to prevent the passage of fluid, a means for bringing the valve into open position when coupling up, to permit the passage of fluid, and an internal sealing device preventing, in closed position, the passage of fluid outside the contact body toward the tip.

The valve can be made in various ways. Thus, according to a preferred embodiment, the valve is constituted by a skirt sliding in the inner chamber of the contact body and receiving the elastic device, the said skirt being prolonged by a part of smaller diameter equipped with at least one orifice on its perimeter to permit the passage of the fluid between the inner recess of the skirt and the inner chamber of the contact body, the said part terminating in a closure cone. According to another embodiment, the valve is constituted by a solid piece mounted at the end of a guide shaft on which the elastic device is positioned, this guide shaft sliding in a journal mounted in the contact body and equipped with at least one orifice for the passage of heat-carrying fluid.

According to still another embodiment, the valve can be constituted by a ball mounted at the end of the elastic device which in this case is constituted, preferably, by a conical coil spring, the elastic device being held in position in the contact body by shoulders.

According to still another embodiment, the valve can be constituted by a slide valve.

Furthermore, the means for bringing the valve into the open position, on coupling, to permit the passage of the fluid, is preferably constituted by a control rod projecting from the end of the valve into the male and-/or female tip.

According to another characteristic of the present invention, the end of the contact body opposite that of the tip is mounted in a coupling which permits the connection to a printed card with a built-in heat exchanger constituted by a drain having a network of channels for the circulation of the heat-carrying fluid.

The fluidic connector described above has numerous advantages. In particular, its size is very small and the fluidic contacts which constitute it are compatible with the standardized openings of the plug or of the receptacle of existing electrical connectors.

Furthermore, the projection of one or both of the fluidic contacts relative to the front end of the plug or of the receptacle of the connector is compatible with the proper operation of the guides and alignment mechanisms of the said connector. Furthermore, each fluidic contact has a small number of parts, and it is thereby very simple in design and hence trouble-free, reliable and sturdy.

Furthermore, in the case of self-plugging miniature fluidic connectors it is possible to operate the insertion and extraction of a card without loss of fluid and without stopping the circulation of the fluid in the frame and in the other cards. Furthermore, the fluidic contact works with minimal losses of pressure in the passage of the fluid despite the very samll dimensions imposed by the openings of the electrical connectors. It withstands the pressure of the heat-carrying fluid both in coupled and uncoupled position. There is no loss of fluid either on the receptacle side of the connector or on the plug side when coupling or uncoupling the card. The number of coupling and uncoupling maneuvers can be high and compatible with the exigencies of conventional connectors. And at the moment of coupling, it will accept an angular disalignment similar to those generally allowed for conventional contacts. It can be made of materials chemically compatible with the nature of the heat-carrying fluid.

BRIEF DESCRIPTION OF THE DRAWINGS

FIG. 1 is a sectional view of a fluidic connector according to the present invention in uncoupled position.

FIG. 2 is a sectional view of the fluidic connector in FIG. 1 in coupled position.

FIG. 3 is a partial view in section of a fluidic contact mounted in the plug of an electrical connector fixed on a card with circulation of fluid representing a variation of the leakproof link between the contact body and the coupling.

FIG. 4 is a perspective view of an embodiment of a clip holding the fluidic contact in the opening of the electrical connector.

FIG. 5 is a partial view in section of another embodiment of the connection of the fluidic contact on the printed card.

FIG. 6 is a partial view in section of still another embodiment of the connection of the fluidic contact with the printed card.

FIG. 7 is a partial view in section of still another embodiment of the connection of the fluidic contact with the printed card.

FIG. 8 is a partial view in section of another embodiment of a fluidic connector according to the present invention, in coupled position.

FIG. 9 is a sectional view of a third embodiment of a fluidic connector according to the present invention.

FIG. 10 is a sectional view of a fourth embodiment of a fluidic connector according to the present invention in coupled position.

DESCRIPTION OF THE PREFERRED EMBODIMENTS

In the figures, for simplicity of the description, the same elements bear the same references.

The various figures represent a fluidic connector according to the present invention mounted in the openings of an input/output electrical connector for a printed card, the printed card being cooled by circulation of a heat-carrying fluid. Nevertheless it will be clear to those skilled in the art that the fluidic connector of the present invention can be mounted in other types of electrical connectors such as rectangular connectors, cylindrical connectors or the like.

FIG. 1 represents a fluidic connector according to the present invention comprising a female fluidic contact 3 mounted in the plug 2 of the electrical connector and joined to the circulation channels of a printed circuit card 1 cooled by circulation of fluid and a male fluidic contact 5 mounted in the receptacle 4 of the said connector. It will be understood by those skilled in the art that the male fluidic contact and the female fluidic contact can be mounted in the reverse manner by adopting the proper connections.

Reference is first made to the female fluidic contact 3 shown in the left-hand side of FIG. 1 and 2. This fluidic contact is constituted by a contact body 68 whose external part insures the embedment of the fluidic contact in the opening 135 of plug 2 of the electrical connector and whose internal part is equipped with a self-plugging device described below, contact body 68 being prolonged by a female tip 69 ensuring the semipermanent connection with the contact of the opposite sex mounted in the receptacle of the connector. The female tip 69 and the contact body 68 appear in the form of two coaxial cylindrical tubes linked to one another, but different in diameter. The outer diameter of the female tip 69 is larger than the outer diameter of contact body 68 so as to form a shoulder 77 for holding in place a clip 143 designed to ensure the attachment of fluidic contact 3 in the opening of plug 2 of the electrical connector. Furthermore, contact body 68 and female tip 69 are separated by an internal partition equipped with an orifice of communication 76.

The inner cavity 72 of female tip 69 of female contact 3 is designed to receive the male tip 101 of contact 5 when the two contacts are coupled. Thus, in order to facilitate this coupling, the inner edge of the entry of cavity 72 has a rounded portion 74 which assists the engagement of male tip 101, by correcting any misalignment of the latter relative to the axis 53 of the female contact and prevents injury to the sealing washer provided on the male tip of the male contact as the latter engages in cavity 72. Furthermore, the outer edge of the entry of cavity 72 has a bevel 73 that assists in the engagement of the outer contour of the female tip in the opening 135' of the receptacle 4 of the connector of the mother card or of the chassis.

In the case of the fluidic connector in FIGS. 1 and 2 the female fluidic contact contains a self-plugging device. It is nevertheless conceivable, without departing from the scope of the present invention, to have a fluidic contact without a self-plugging device.

This self-plugging device is constituted by a valve 90, and an elastic device urging the valve into closed position to prevent the passage of the fluid in uncoupled position, this elastic device being constituted by a coiled compression spring 47 in the embodiment shown, and a means which, during the coupling, brings the valve into open position to permit the passage of the fluid, this means being constituted, for example, by a control rod 91 prolonging the end of the valve and inner sealing device constituted for example by a washer or O-ring 65. This self-plugging device is mounted in the inner chamber 66 of the contact body 68. According to a first embodiment, valve 90 which is made in one piece is constituted by a cylindrical skirt 87 whose external guidance contour 88 slides in inner chamber 66 of contact body 68 and whose inner recess 89 receives compression spring 47. Cylindrical skirt 87 is prolonged by a part 85 smaller in diameter than the skirt and is equipped on its perimeter with orifices 95 to permit the passage of fluid between the inner recess of skirt 87 and the inner chamber of contact body 68. Part 85 terminates in a closure cone 86. In the embodiment shown, the closure cone 86 is prolonged by a control rod 91 of smaller diameter than hole 76 communicating between the contact body and the female tip. Control rod 91 is co-axial to the axis of the contact body and projects into the inner recess 72 of the female tip so as to cooperate with the corresponding control rod of the male contact 5 during the coupling of these contacts to repel valve 90 toward the opposite end of the inner chamber of the contact body and thus unplug the contact in order to establish the fluidic connection.

A shoulder 98 is formed at the level of the junction between cylindrical skirt 87 and the part 85, shoulder 98 serving as a stop for compression spring 47 mounted inside inner recess 89 of skirt 87.

In uncoupled position, as shown in FIG. 1, spring 47 compresses the pressure face of the closure cone 86 on the inner washer 65 which is in turn flattened against the bottom 78 of inner chamber 66, thereby establishing the self-plugging of fluidic contact 3 in uncoupled position. The action of the compression spring 47 is supplemented by the trust due to the pressure of the heat-carrying fluid.

The inner washer 65 is, for example, a toric gasket made of an elastomer such as nitrile, fluorocarbon, or silicone, this material being capable of withstanding chemical attack of the various types of heat-carrying fluids. Gasket 65 is placed in a groove 80 provided against the bottom 78 of inner chamber 66 of the contact body, in order to avoid being displaced inside the said recess and producing surges or "hammer" in the channels circulating the heat-carrying fluid. Preferably, as shown in FIG. 1, this groove is obtained with the aid of a shoulder 82 formed from the wall of inner chamber 66, the diameter of the top of shoulder 82 being very slightly greater than that of the outer contour of part 85 of the valve. Thus, during the uncoupling operation, the choking of the passage of the fluid generated by the top of the shoulder and the outer contour of part 85 which is then at the same level creates, at the beginning of the self-plugging of the fluidic contact, a drop in pressure of the fluid just before washer 65 is compressed by the closure cone 86 of the valve and establishes the leak-proof plugging of the contact. This pressure drop created during the phase of self-plugging of the contact enhances the efficiency and the life of the washer 65. To facilitate the emplacement of washer 65 in groove 80 as the fluidic contact is being made, the shoulder of the groove preferably has an engagement bevel 84 on the side of the shoulder opposite the wall of the groove. Note that in coupled position, as shown in FIG. 2, the shoulder of the groove causes no disturbance in the circulation of the heat-carrying fluid.

The end of the contact body opposite female tip 69 is embedded in a recess 56 of a coupling 50 insuring the fluidic connection of contact 3 with the channel network of the card with fluid circulation. In the example shown in FIG. 1, this embedment is obtained by force-fitting contact body 68 into coupling 50, the facing diameters of the two elements being designed for a tight fit. To gurantee the tightness of the bond between coupling 50 and contact body 68, an annular gasket 62 is placed at the bottom of recess 56 of coupling 50. Gasket 62 is compressed by the end 67 of contact body 68. The compression of gasket 62 is obtained during the operation of force-fitting of body 68 into coupling 50 and maintained by the strong forces of retention of the fit. This tightness can likewise be obtained by an intermetallic sealing bond 63, 64 as shown in FIG. 3. The tightness and the attachment of coupling 50 on contact body 68 can also be produced by operations of gluing, brazing or shrink-fitting.

In the embodiment shown, coupling 50 appears in the form of a parallelopipedic block, of which one face 55 is pierced with a stepped hole not opening on the rear face. This stepped hole is composed of the embedment recess 56 of the same diameter as the outer contour of the contact body 68 and of an inner conduit 52 which is concentric to recess 56 and has a diameter slightly smaller than the inner diameter of spring 47, so that the shoulder between the inner conduit and the recess forms a stop for the end of the said spring and of gasket 62.

One of the faces perpendicular to face 55, namely face 58, which rests on card 1, is pierced with a hole 51 that only partially extends through the coupling, so that hole 51 and the inner conduit 52 will be secant and open into one another. This face 58 is likewise pierced with two tapped holes 33 and 34 situated on either side of hole 51. These tapped holes 33 and 34 are used for the attachment of coupling 50 on printed card 1 as shown in FIGS. 1 and 2. Moreover, face 58 is equipped with an annular groove 42 concentric to hole 51 which serves as an accommodation for an annular gasket 37 insuring a seal between coupling 50 of fluidic contact 3 and the end 51 of the network of channels of card 1 with circulation of fluid.

As already mentioned, the outer contour of female tip 69 has a diameter slightly smaller than that of the outer contour of contact body 68. The two outer contours join by means of a stop face 77 whose plane is perpendicular to the main axis. When the contact body has been fitted into coupling 50, the part of length "l" of the outer contour of the contact body situated between stop faces 77 and 55 is used to place a retention clip 143, to lock fluidic contact 3 in the opening 135 of insulation 130 of connector 2. As shown in FIG. 4, this retention clip appears in the form of a thin elastic tube of length "l", slit along one generatrix 143" and having on its perimeter several retention tabs 143', projecting and elastically deformable. The clip is immobilized in translation on contact body 68 by the stop faces 77 and 55.

Reference is now made to the male fluidic contact 5 shown on the right-hand side of FIGS. 1 and 2. This male contact is constituted by a contact body 68' of cylindrical shape which is prolonged by a male tip 101 appearing in the form of a metal tube equipped on its outer surface with a groove 107 serving as a recess for a washer 125. The diameter of the outer contour of male tip 101 is very slightly less than that of cavity 72 of female tip 69 of the female contact. The outer diameter of gasket 125 mounted in its recess is very slightly larger than that of cavity 72 so as to be compressed on its perimeter when it is engaged in the latter and thus insures the sealing of the fluidic connection. Furthermore, the end of male tip 101 preferably has an entry bevel 106. Entry bevel 106 cooperates with round portion 74 to facilitate the engagement of male tip 101 in cavity 72 of female contact 3. Moreover, the diameter of the hole 76' in male tip 101 is equal or close to the diameter of communicating hole 76 in female tip 60 to permit the passage of the heat-carrying fluid along a section that is substantially constant through the fluidic connection.

The length of male tip 101 separating the front face 105 thereof and the stop face 102 is substantially equal to that of the depth of inner cavity 72 of female tip 69.

The self-plugging device contained in the inner chamber 66' of the contact body 68' of male contact 5 of receptacle 4 is identical to that of female contact 3 of plug 2. Consequently, it will not be described herein and the same elements will bear the same references with a prime. Furthermore, the outer contour of contact body 68' with the clip locking contact 5 in opening 135' of receptacle 4 is identical to that of contact 3 of plug 2 except that one end of the clip presses on the pressure face 109 of contact body 5 instead of pressure face 55 of coupling 50 for contact 3 of plug 2.

The fluidic connection of contact 5 of the receptacle differs from that of contact 3 of the plug by the fact that contact 5 is directly connected to the device supplying heat-carrying fluid in the electronic equipment. Thus contact body 68' is prolonged, on the side opposite that of the male tip, by a connecting sleeve 110 whose outer contour 111 is larger than the outer contour 79' of contact body 68'. The outer contours 111 and 79' are connected by a pressure face 109 perpendicular to the axis of the contact body. During the assembly, this face 109 comes to press on the rear face 134' of the insulation of receptacle 4. Sleeve 111 has an inner cavity 112 communicating with inner chamber 66' of the contact body and in its prolongation. Cavity 112 terminates at the end of the contact body. The diameter of cavity 112 which has a tapped thread 114, is larger than that of the inner chamber 66'. Cavity 112 receives the coupling 120 of the fluid supply system. The latter appears in the form of a tube equipped with a thread 116 which is screwed into tapping 114 until collar 119 of coupling 120 begins to compress an annular packing 124 inserted between itself and the end 113 of sleeve 111. Coupling 120 has a bore 117 whose diameter is slightly smaller than the inner diameter of compression spring 47'. The front face 118 of coupling 120 severs as a support for the terminal turn of spring 47'.

FIG. 1 shows a sectional view of the fluidic connection system in uncoupled position. Note that in this case the pressure faces 92 and 92' of the control rods of the valves of the fluidic contacts are preferably set back relative to the ends of the latter, that is to say, respectively relative to the protective round 74 of the female tip of the female contact and to the front face of male tip 101 of the male contact. As a matter of fact, if, in the uncoupled position, one of the fluidic contacts exhibits a valve rod protruding relative to the end of the contact, the guarantee of self-plugging of the latter is not well assured because the control rod risks being accidentally brought into contact with an object and thus cause a leakage of heat-carrying fluid. In the case of the example described, the control rods which remain in the interior of cavities 72 and 72' are naturally protected from such a risk. Moreover, if the two control rods of the male and female contacts are protuberant in the uncoupled state, it is not possible to uncouple them without causing leakages of fluid. Consequently, the control rods are set back by a length "a" relative to the protective rounding 74 of the male contact and by a length "b" relative to the front face 105 of the male contact.

In order to make the connection and disconnection without leakage of heat-carrying fluid, it is necessary that the washer 125 be able to slide on the inner contour of the inner cavity 72 before the pressure faces 92, 92' of the control rods come into contact at the moment of coupling. This implies that:

(1) "a" is greater than "c" if the face 92' is situated between the face 105 and the plane of symmetry of the gasket 125, "c" being the distance between this plane of symmetry and the face 92'.
(2) or that the face 92' is set back relative to the plane of symmetry of gasket 125.

FIG. 2 shows a sectional view of the entire fluidic connection system in coupled position. The essential condition, if the fluidic connection is to be insured in coupled position, is that the closure cones 86, 86' of the valves 90, 90' no longer press on the washers 65, 65'. Now, as a function of the conditions of pressure and the direction of circulation of the heat-carrying fluid, as well as of the respective forces of compression of springs 47 and 47', the kinetics of the self-plugging device of the female and male fluidic contacts can be done in different ways at the moment of connection of the latter.

Thus, either the two valves 90 and 90' are opened conjointly as soon as their control rods press on one another, and then the fluidic connection is immediately insured, or one of the two valves 90 or 90' first opens completely until its receptacle 99 presses on the bottom of this recess, then the opening of the second begins. Then, at this moment only, the fluidic connection is made.

The penetration of male contact 5 into female contact 3 is limited by the meeting of the front faces 133 and 133' of the respective insulations of the plug and of the receptacle of the electrical connector. Thus to insure the fluidic connection in all the figure cases, the algerbraic sum "d+e" must be larger than the highest of the two values "f", "g" in which:

"d" is the distance between faces 92 and 133 in the uncoupled state,

"e" is the distance between faces 92' and 133' in the uncoupled state.

("d" or "e" will have a positive sign when the pressure face of the control rod of the valve projects beyond the plane of the front face of the insulation, and a negative sign when it is retracted relative to the latter.), "f" is the distance between receptacle 99 of the valve and bottom 57 in the uncoupled state, and "g" is the distance between the receptacle 99' of the valve and the face 118 in the uncoupled state.

("f", "g" having a positive sign.)

The difference Δ between the algebraic sum "d+e" and the higher of the two values "f" and "g" constitutes what is called the plug-in security of the connector.

It expresses the maximum spread Δ between the two insulators 133 and 133' for which the fluidic connection is assured. The distances a, b, c, d, e, f, and g will preferably be determined so that the plug-in security Δ of the fluidic connection will be at least equal to that of the other contacts of the electrical connector.

FIGS. 5 to 7 show a number of variations of embodiment of the connection of fluidic contact 3 on the daughter card 1. In FIG. 5, the mechanical attachment of coupling 50 of fluidic contact 3 on card 1 with fluid circulation is embodied by means of a hollow screw 160. This hollow screw 160 is mounted in orifice 51 with a tapped thread 167 of coupling 50 and is situated in the passage of the heat-carrying fluid. As a result, the threaded rod 165 of screw 160 has a hole 162 with axis 40 that terminates in inner conduit 52 of coupling 50 and with the end 15 of the channel network of the card by means of holes 161 with axes perpendicular to axis 40 and pierced in threaded rod 165 under the head 163 of the screw. Moreover, the bottom of channel 17 of the card is pierced with a hole 168 for the passage of screw 160 and as a result it is necessary to place a gasket 169 in a shoulder 164 of head 163 to insure the sealing of the device. Consequently, hollow screw 160 ensures securing of coupling 50 on card 1. As a result one single screw suffices to ensure the attachment with a guarantee of an effective seal between coupling 50 and card 1 because the pressure is thus distributed uniformly over the perimeter of the gaskets.

This variation has the following advantages:
reduction in the number of attachment screws and consequently, the simplification of coupling 50 and reduction of its volume, which increases the useful surface for the implanation of components on the card, and simplification of the network of channels of the plate of the heat drain 10 because the ends 15 and 16 can be situated directly in the prolongation of the channels.

FIG. 6 shows a sectional view of a system of fluidic connection similar to that in FIG. 5, in which a fluted screw 170 is used in place of screw 160. In this case the passage of the heat-carrying fluid between end 15 of the network of channels in the card and inner conduit 52 of coupling 50 is made through the flutings 172 cut longitudinally on the outside of the threaded shaft of fluted screw 170 instead of through the inner hole 162 in hollow screw 160.

FIG. 7 shows in section a view of a system of fluidic connection coupled on the transverse edge 27 of card 1. This variation is used in particular when the output terminals of the electrical contacts of the plug are soldered flat on either side of card 1 so that the plane of the latter proves to be substantially in the prolongation of the plane of symmetry of plug 2 instead of being offset on one side or the other as shown in the other figures. In this case coupling 50 has a slot 187 in the axis of the fluidic contact 3. Coupling 50 is pierced along an axis perpendicularly to slot 187. The hole 191 in the upper part of the coupling terminates on the upper face in a beveled orifice 193. The hole 192 with the same axis as hole 191 terminates on the lower face in a beveled orifice 194. End 15 of the channel network of card 1 has an opening 196 terminating on the transverse edge 27 of the card. In this variation, no hole communicating with end 15 is pierced in closure plate 11. A guide hole 197 is pierced in the prolongation of opening 198, but outside the network of channels. The connection of card 1 on the plug of connector 2 is operated as follows. A flat gasket 195 is introduced at the bottom of slot 187 of coupling 50 so that the hole of the gasket will be face to face with inner conduit 52. Card 1 is engaged simultaneously in slot 187 of coupling 50 and between the two rows of output terminals of the electrical contacts. A cone-head screw 180 passing through holes 191, 197 and 192 is introduced into coupling 50. The diameter of the smooth part 184 of the threaded shaft 185 of screw 180 is equal to the diameter of hole 197 in the card and smaller than the diameter of holes 191 and 192.

At this moment, the axis 196 of screw 180 is offset toward the rear face of coupling 50 relative to the axis of holes 191 and 192. A conical nut 181 is then screwed on threaded shaft 185 of screw 180. Under the influence of the tightening of this nut, the pressure cone 186 of the head of screw 183 and the pressure cone 182 of nut 181 cooperate respectively with orifices 193 and 194 to displace card 1 in the direction of the arrow f toward the bottom of slot 187 in coupling 50. When the complete tightening of the screw and the nut is achieved, axis 196 of screw 180 coincides with the axis of holes 191 and 192 and gasket 195 is compressed to insure the seal of the coupling of fluidic contact on card 1.

There will now be described, with reference to FIGS. 8 to 10, some variations of embodiments of the self-plugging device, the other parts of the fluidic contacts being substantially similar to those shown in FIGS. 1 and 2.

In the embodiment in FIG. 8, the valve is constituted by a solid piece 900 equipped at the rear opposite control rod 91 with a guide shaft 901 sliding in a journal 902 provided in the interior of inner chamber 66 of contact body 68. The journal is equipped with longitudinal orifices for the passage of the fluid. In this case compressing spring 47 is mounted around the guide shaft between journal 902 and the rear face of solid piece 900. Moreover, the coupling 50' permitting the connection of fluidic contact 3 with the card has a form slightly different from that of coupling 50 in FIGS. 1 and 2.

The contact body 68 is no longer inserted in a recess 56 terminating on one face of coupling 50 as in the embodiment in FIGS. 1 and 2, but the contact body 68 has, at its rear ends, a tapped internal recess 67 larger in diameter than inner recess 66 in order to be screwed on a threaded coupling part 54 replacing the recess 56. In this embodiment, the same plug devices are provided in the male fluidic contact and the female fluidic contact, as will clearly be seen in FIG. 8, with the exception of the fact that the control rods of the male and female contacts are unequal but answer to the algebraic sum "d+e" mentioned above.

FIG. 9 shows another variation of the plug device. In this figure, the male fluidic contact is mounted in an opening 135 of plug 2 of the electrical connector coupled on the daughter card while the female fluidic contact is mounted on receptacle 4 of the said connector. The plug device of the male fluidic contact is constituted by a ball 910 actuated by a compression spring 470 preferably constituted by a conical spring for a better seating of the ball. This ball serves as self-plugging valve as it compresses an annular washer 65. Moreover, compression spring 470 is positioned between the rear face of the ball and a shoulder 471 embodied by a cylindrical tube which is positioned in the interior of the inner chamber of the contact body and pressing against the bottom of recess 56 in coupling 50 which, in this embodiment, is identical to the coupling in FIG. 1. Moreover, the female fluidic contact is equipped with an external-flow valve substantially identical to the valve described in reference to FIG. 8, thus this valve will not be described in detail. Nevertheless, the toric gasket 65 is replaced by a gasket 65" mounted on the front face of valve 900. In this case the ball is not equipped with a control rod, hence the length of the control rod of the external-flow valve will have a length equal to "d+e".

Other types of plug devices can be envisaged. Thus, so-called slide valves can be envisaged.

Such a valve is shown, for example, in FIG. 10.

In this case contact body 68 of female fluidic contact 3 has a modified form. As a matter of fact, inner chamber 66 has, on the side of the female tip, a part 66" of larger diameter for the passage of the heat-carrying fluid when the two contacts are coupled. Moreover, the diameter of inner cavity 72 of the female tip is identical to the diameter of the rear part of the inner chamber. As shown in the figure, two washers 650, 651 are provided in grooves formed respectively in the rear part of inner chamber 66 and inner cavity 72. In this case the value is constituted by a cylindrical piece 920 closed at one end, whose outer diameter corresponds to the inner diameter of the rear part of inner chamber 66 and of the inner cavity of the tip so as to slide inside the body 68 and the female tip.

Furthermore, piece 920 is equipped with at least one orifice 921 for passage of the heat-carrying fluid. It also has, at its rear end a bore 922 of larger diameter receiving a compression spring 47 which, in uncoupled position, urges the piece projecting into the female tip so that the fluid cannot flow out of part 66''. The rear end of spring 47 presses against a ring provided in the bottom of recess 56 of coupling 50. The orifices 921 are positioned on the cylindrical piece so that in coupled position they coincide with part 66'' as shown in FIG. 10.

Furthermore, piece 920 is prolonged by a control rod 91. The contact body 68 is mounted in a coupling 50 similar to coupling 50 in FIG. 1.

The right-hand part of FIG. 10 shows a male fluidic contact 5 equipped with a slide valve cooperating with the slide valve of the female fluidic contact. In this case the valve is constituted by a cylindrical piece 920', closed at one end and equipped on its perimeter close to this end with at least one orifice 921', this piece being urged, in uncoupled position, by a spring 47', toward the front end of the male tip which is then constituted by a cylindrical piece 101' equipped at its front end with a hole whose diameter corresponds to the diameter of rod 91. Furthermore, the male tip 101' has, on its perimeter, at least one orifice 101'' whose position corresponds, when the connector is coupled, to the position of orifice 921' of the valve.

Thus, during the coupling, rod 91 cooperates with the end of piece 920' to repel valves 920 and 920' so that the orifices 921' and 101' will be made to correspond and so that these orifices and so orifices 921 will be in communication with part 66'' to permit the passage of the fluid as can clearly be seen in FIG. 10.

Various modifications can be brought to the form of the contacts, couplings or valves without departing from the scope of the present invention.

We claim:

1. A miniature fluidic connector mountable in an electrical connector of the type comprising a plug and a receptacle, each provided with openings, said electrical connector being adapted to be mounted to a printed circuit board having a built-in heat exchanger comprising a drain having a network of channels for the circulation of a heat-carrying fluid, said fluidic connector comprising a male fluidic contact and a female fluidic contact, said male fluidic contact comprising a contact body having an inner chamber permitting the passage of said heat-carrying fluid and being embedded in an opening of one of said plug and said receptacle of said electrical connector of a standard size normally receiving an electrical contact, said male contact body being prolonged on one side by a male tip, and the female fluidic contact comprising a contact body having an inner chamber permitting the passage of said heat-carrying fluid and being embedded in an opening in the other element of said electrical connector also of a standard size normally receiving an electrical contact, said female contact body being prolonged on one side by a female tip shaped to receive said male tip, at least one of said male tip and said femal tip projecting in part relative to the end of its respective opening so that, when coupled, the ends of the openings of said plug and of said receptacle of said electrical connector will be substantially pressed against one another, said inner chambers of said male contact body and said female contact body each having mounted therein a self-plugging device comprising a valve, an elastic device urging said valve into a closed position to prevent the passage of said fluid, a means which, during said coupling, brings said valve into an open position to permit the passage of said fluid through said contact bodies, and an internal sealing device which, in a closed position, prevents the passage of said fluid out of said contact bodies towards the respective tip, said valves further comprising a skirt slidable in said inner chamber of said contact body and receiving said elastic device, said skirt being prolonged by a part of smaller diameter to permit the passage of said fluid between an inner recess of said skirt and said inner chamber of said contact body, the said part terminating in a closure cone, said electrical connector comprising an insulating body having said standard size opening and a second opening disposed at a right angle to said standard sized opening and being adapted for communication with said network of channels in said board, one of said male and female fluidic contacts being mounted in one of said standard size openings such that its inner chamber is in communication with said second opening of said electrical connector, whereby said fluid is flowable through said one fluidic contact, through said second opening and into said network of channels in said board.

2. The fluidic contact of claim 1, wherein said other of said male and female fluidic contacts includes mounting means opposite its respective tip for coupling to a device supplying said heat-carrying fluid.

3. Fluidic connector according to claim 1, characterized in that said means which, during the coupling, brings said valve into its open position to permit the passage of the fluid, comprises a control rod projecting from the end of said valve in at least one of male and female tips.

4. Fluidic connector according to claim 1, characterized in that said internal sealing device comprises a toric gasket positioned in a groove provided in said contact body adjacent to said male or female tip.

5. Fluidic connector according to claim 4, characterized in that said groove is defined by a wall separating said body from said tip and by a shoulder provided on the perimeter of said inner chamber of said contact body, the diameter of the top of said shoulder being slightly larger than that of the outer contour of the corresponding valve part.

6. Fluidic connector according to claim 1, characterized in that said contact body of said male or female fluidic contact is retained in position in said opening of said plug or said receptacle of said electrical connector by a clip.

* * * * *